W. D. HICKS.
AUTOMOBILE ENGINE STARTER.
APPLICATION FILED JUNE 10, 1918.
1,298,947.
Patented Apr. 1, 1919.
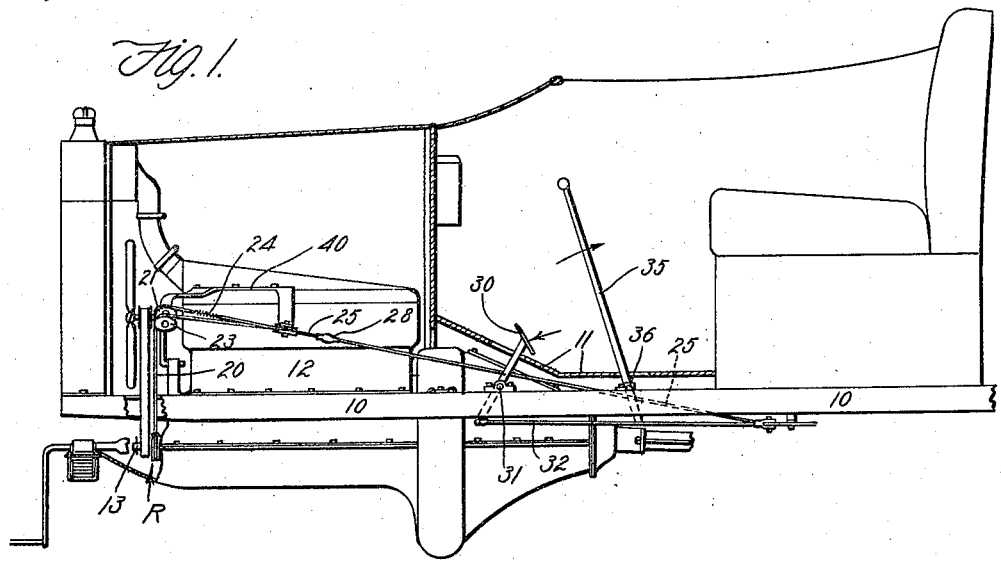
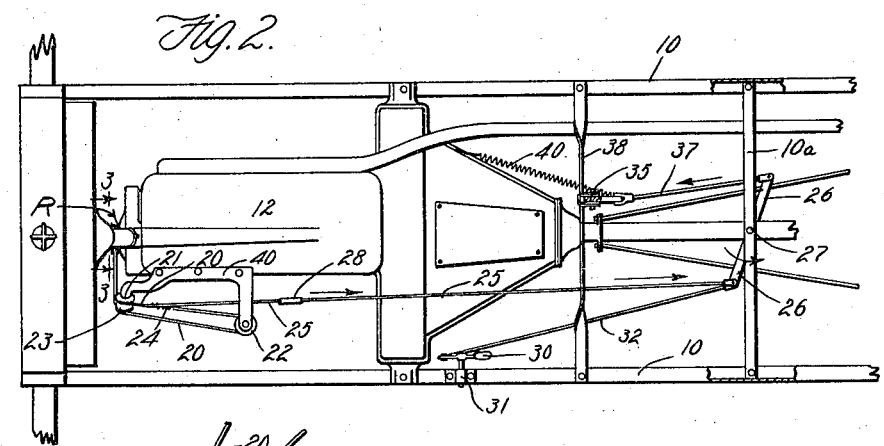
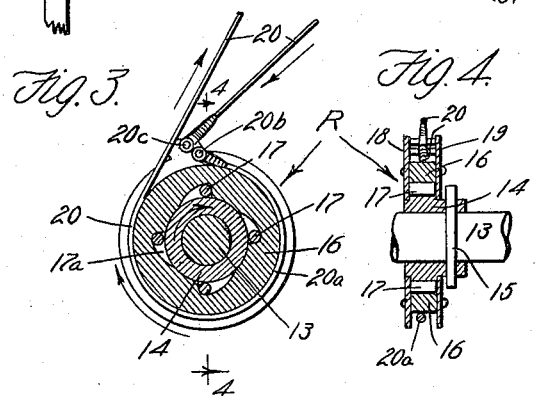 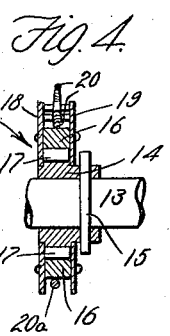 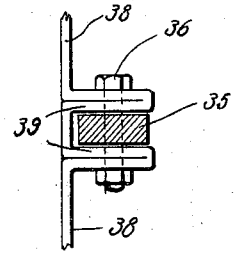
Inventor
William D. Hicks
by
his Attorney

UNITED STATES PATENT OFFICE.

WILLIAM D. HICKS, OF LOS ANGELES, CALIFORNIA, ASSIGNOR OF ONE-FOURTH TO R. M. DOYLE, OF LOS ANGELES, CALIFORNIA.

AUTOMOBILE-ENGINE STARTER.

1,298,947.          Specification of Letters Patent.          Patented Apr. 1, 1919.

Application filed June 10, 1918. Serial No. 239,175.

*To all whom it may concern:*

Be it known that I, WILLIAM D. HICKS, a citizen of the United States, residing at Los Angeles, in the county of Los Angeles, State of California, have invented new and useful Improvements in Automobile-Engine Starters, of which the following is a specification.

This invention relates to starters for automobile engines; and relates more particularly to mechanical starters adapted to be manually operated for starting automobile engines. And it is an object of this invention to provide a simple, reliable and powerful means whereby an automobile engine may be effectually and quickly started from a position in the automobile seat. I am aware that heretofore it has been proposed to have starting mechanisms which are operatable from a position in the automobile seat; but it is difficult in such a position for a person to exert any effective force sufficient to effectively start the engine. It is an object of this invention to provide a mechanism whereby a person sitting in an automobile seat may easily and without the expenditure of any excessive effort start the automobile engine as quickly and surely as the engine may usually be started by a starting motor or the like.

To accomplish this object I have devised a system and organization of power levers or pedals which facilitate an efficient application of the maximum energy which a person can apply without unusual or excessive exertion. My system and organization will be best understood from the following description of a preferred form of my starting device; reference for this purpose being had to the accompanying drawings in which—

Figure 1 is a side elevation, with parts in section, showing my starting device applied to a well known form of automobile; Fig. 2 is a plan section of the same; Fig. 3 is an enlarged detail section taken as indicated by line 3—3 on Fig. 2; Fig. 4 is a section taken on line 4—4 of Fig. 3; and Fig. 5 is an enlarged detail of certain parts shown in Fig. 2.

In the drawings I show the forward portion of an automobile and show its frame 10, floor boards 11, engine 12, and engine shaft 13. In order to apply rotative force to the engine shaft in the direction of rotation of the engine, and at the same time provide that the rotation of the engine shaft in that direction shall not rotate the starting mechanism, I mount a ratchet device R on the engine shaft 13. This ratchet device may preferably comprise a sleeve 14 keyed or pinned at 15 to the engine shaft; a rotatable member 16 on the sleeve, and ratchet rollers 17 between the sleeve and member 16. The member 16 is confined between the flanges 18 and 19 which are set upon the sleeve. These flanges 18 and 19 also serve to confine a cable 20, one end of which passes around the member 16 at 20$^a$ and is secured at its end at 20$^b$ to the member 16 or to flanges 18 and 19, which flanges are secured to the member 16. Cable 20 extends upwardly and over a pulley 21 and then extends rearwardly and somewhat diagonally downwardly to and over a pulley 22 and thence forwardly again and over a pulley 23 and then down to the ratchet device where its other end is secured at 20$^c$. Between pulley 21 and pulley 22 the cable has a spring 24, which tends at all times to keep the cable tight around the pulleys and around the ratchet member 16. Just forward of the spring 24 a connection is made to the cable by the operating rod 25 which extends rearwardly and downwardly and is attached at its rear end to one end of a lever 26 which is centrally pivoted at 27 to a cross-piece 10$^a$ on the framework of the car. A turn-buckle at 28 in rod 25 provides means for adjusting the length of the rod. I mount a foot pedal 30 pivotally at 31, and a lower extension of the pedal below its pivot is connected by rod 32 with the same end of lever 26 that rod 25 connects to. Forward pressure on the foot pedal will throw lever 26 around in the direction indicated and will move the various parts of the device in the directions indicated. I also mount a hand lever 35 on a pivot at 36, and the lower end of this hand lever which projects below the pivot is connected by rod 37 with the end of lever 26 opposite that to which rods 25 and 32 connect. Rearward movement of the hand lever causes the same movement of lever 26 as forward movement of pedal 30 causes. Hand lever 35 is pivoted at 36 upon a cross-bar 38 mounted across the frame of the car; and this cross-bar is bent into the U-shaped formation illustrated at 39 to form a mounting for the pivot 36 of lever 35. A spring 40 connected between the lower end of lever 35 and some stationary point forward of the lever tends to bring all of the parts in the system back to their normal position of rest—the position shown in the drawing.

Now when it is desired to start the automobile engine the operator sitting in the automobile seat places a foot upon the foot-pedal and a hand upon the hand-lever. He simultaneously presses with his foot and pulls with his hand. This is an action by which he can exert a great deal of force with a comparatively small effort on his part; because each one of these actions counteracts the other. It might be said that by pushing on the foot-pedal he braces himself to pull upon the hand-lever; and by pulling upon the hand-lever he braces himself to push upon the foot-pedal. The foot-pedal and hand lever are put in suitable position as to be easily and effectively operated by the driver in a convenient posture. The movement of the foot pedal and hand lever in the directions indicated causes the movement of operating cable 20 in the direction indicated and thus causes rotation of the sleeve 14 and shaft 13 in the direction indicated. Such rotation, at a reasonably high speed, quickly causes the motor to start. High speed of rotation can be easily attained owing to the powerful effect possible with the use of my device. As soon as the pedal and lever have been moved through their effective strokes, the spring 40 will bring them back to their normal positions.

A feature of the invention is the construction and operation of the ratchet mechanism R. Instead of using a tooth and pawl mechanism which catches only at certain points and sometimes must travel a considerable distance before catching, I use a roller mechanism comprising the rollers 17 rolling against the surface of sleeve 14 and confined in pockets 17ᵃ in member 16. These pockets have back walls which converge toward the surface of sleeve 14; so that when member 16 is rotated in the direction indicated, then, within a very short movement— a fraction of an inch—the rollers become bound between member 16 and sleeve 14. Sleeve 14 then rotates with member 16. It will be seen that my mechanism accomplishes all the results that an ordinary ratchet mechanism can accomplish; and besides that it catches and holds solidly in any position and almost instantly as soon as member 16 is moved.

It will be further noted that the mechanism R is very simple and compact and can be easily mounted upon the projecting engine shaft of any automobile.

It will be seen that my device is exceptionally simple in its construction and operation. It is also easily mounted upon any type of automobile; the parts being mounted upon frame parts of the automobile which are already there, or being mounted upon simple supporting structures which may be easily attached to the automobile frame. The pulleys 21, 22, and 23 may all be easily and simply mounted upon a single bracket 40 of the design shown in the drawings, which bracket may be attached to the top of the engine cylinder. However, I do not limit myself to such details of mounting, etc., as herein explained; but consider my invention to be broad enough in its nature to include such changes and modifications of parts as may occur to those skilled in the art or as may fall within the scope of the following claims.

Having described a preferred form of my invention, I claim:

1. An engine starter, comprising a frame, a foot pedal and a hand lever pivoted thereon, mechanism connected with the engine shaft, movement of which mechanism causes rotation of the engine shaft, and means connecting the foot pedal and the hand lever to said mechanism so that movement of the pedal and lever in opposite directions causes movement of said mechanism.

2. An engine starter, comprising in combination with the engine shaft a mechanism adapted upon operation to rotate the engine shaft, an operating lever connected to said mechanism, a foot pedal connected to one end of the lever and a hand lever connected to the other end of said lever so that opposite movements of the foot pedal and hand lever cause movement of said operating lever to cause movement of said mechanism.

3. In combination with an automobile and its engine, a hand lever mounted on the automobile in position convenient to be pulled by hand toward the operator sitting in the automobile seat, a foot pedal mounted on the automobile in position convenient to be pushed by foot away from the operator simultaneously with his pulling of the hand lever, and connection between the foot pedal and hand lever and the engine whereby said movements of the pedal and lever coöperate to rotate the engine.

4. In combination with an automobile and its engine, a hand lever mounted on the automobile in position convenient to be pulled by hand toward the operator sitting in the automobile seat, a foot pedal mounted on the automobile in position convenient to be pushed by foot away from the operator simultaneously and with his pulling of the hand lever and connection between the foot pedal and hand lever and the engine whereby said movements of the pedal and lever coöperate to rotate the engine, said connection embodying a lever to which the foot pedal and hand lever are connected, a ratchet device on the engine shaft, and connection between the last mentioned lever and the ratchet device.

5. In combination with an automobile and it engine, a hand lever mounted on the automobile in position convenient to be pulled by hand toward the operator sitting in the automobile seat, a foot pedal mounted on the automobile in position convenient to be pushed by foot away from the operator simultaneously with his pulling of the hand lever, and connection between the foot pedal and hand lever and the engine whereby said movements of the pedal and lever coöperate to rotate the engine, said connection embodying a lever to which the foot pedal and hand lever are connected, a ratchet device on the engine shaft, a cable wrapped around the ratchet device and adapted by longitudinal movement to cause rotation of the ratchet device, and a rod connection between the last mentioned lever and the cable.

In witness that I claim the foregoing I have hereunto subscribed my name this 3d day of June 1918.

WILLIAM D. HICKS.

Copies of this patent may be obtained for five cents each, by addressing the "Commissioner of Patents, Washington, D. C."